United States Patent [19]
Baranowski et al.

[11] Patent Number: 5,703,470
[45] Date of Patent: Dec. 30, 1997

[54] BATTERY CHARGER WITH POWER DISSIPATION CONTROL

[75] Inventors: Robert Baranowski, Crystal Lake; Matthew Whiting Taylor, Gurnee, both of Ill.

[73] Assignee: Motorola, Inc., Schaumburg, Ill.

[21] Appl. No.: 657,699

[22] Filed: May 29, 1996

[51] Int. Cl.$^6$ ............................................. H01M 10/46
[52] U.S. Cl. ............................. 320/49; 320/51; 320/54
[58] Field of Search ................................ 320/5, 12, 13, 320/21, 27, 30, 35, 36, 39, 40, 49, 51, 54

[56] References Cited

U.S. PATENT DOCUMENTS

| | | | |
|---|---|---|---|
| 3,474,324 | 10/1969 | Arnold | 323/1 J |
| 3,496,450 | 2/1970 | Thiele | 323/1 J |
| 4,395,639 | 7/1983 | Bring | 320/13 |
| 4,472,672 | 9/1984 | Pacholok | 320/32 |
| 4,644,247 | 2/1987 | Burmenko | 320/39 |
| 5,525,893 | 6/1996 | Alberkrack et al. | 320/40 |

OTHER PUBLICATIONS

"Advance Information, Power Field Effect Transistor, N-Channel Enhancement-Mode Silicon Gate TMOS with Current Sensing Capability," Motorola Semiconductor Technical Data, pp. 3–693, No date.

*Primary Examiner*—Edward Tso
*Attorney, Agent, or Firm*—Sylvia Chen

[57] ABSTRACT

A battery charger uses an unregulated DC transformer (100) as a power source for charging a battery pack (101) through a pass device (104). A charger controller (150) instantaneously computes a desired charging current value for maximizing the charging efficiency of the battery charger based on the present voltage of the battery pack (101), ambient temperature data received from a thermistor (121), and charging rates and other charging parameters received from a data-storage device (123) in the battery pack. The charger controller sends the calculated desired charging current information to a power controller (103). The power controller (103) monitors the instantaneous power dissipation of the pass device (104) and scales the desired charging current value to prevent excessive power dissipation in the pass device (104). By allowing the charging voltage to vary and dynamically adjusting the charging current, various types of batteries can be recharged without the use of an expensive tracking regulator.

20 Claims, 3 Drawing Sheets

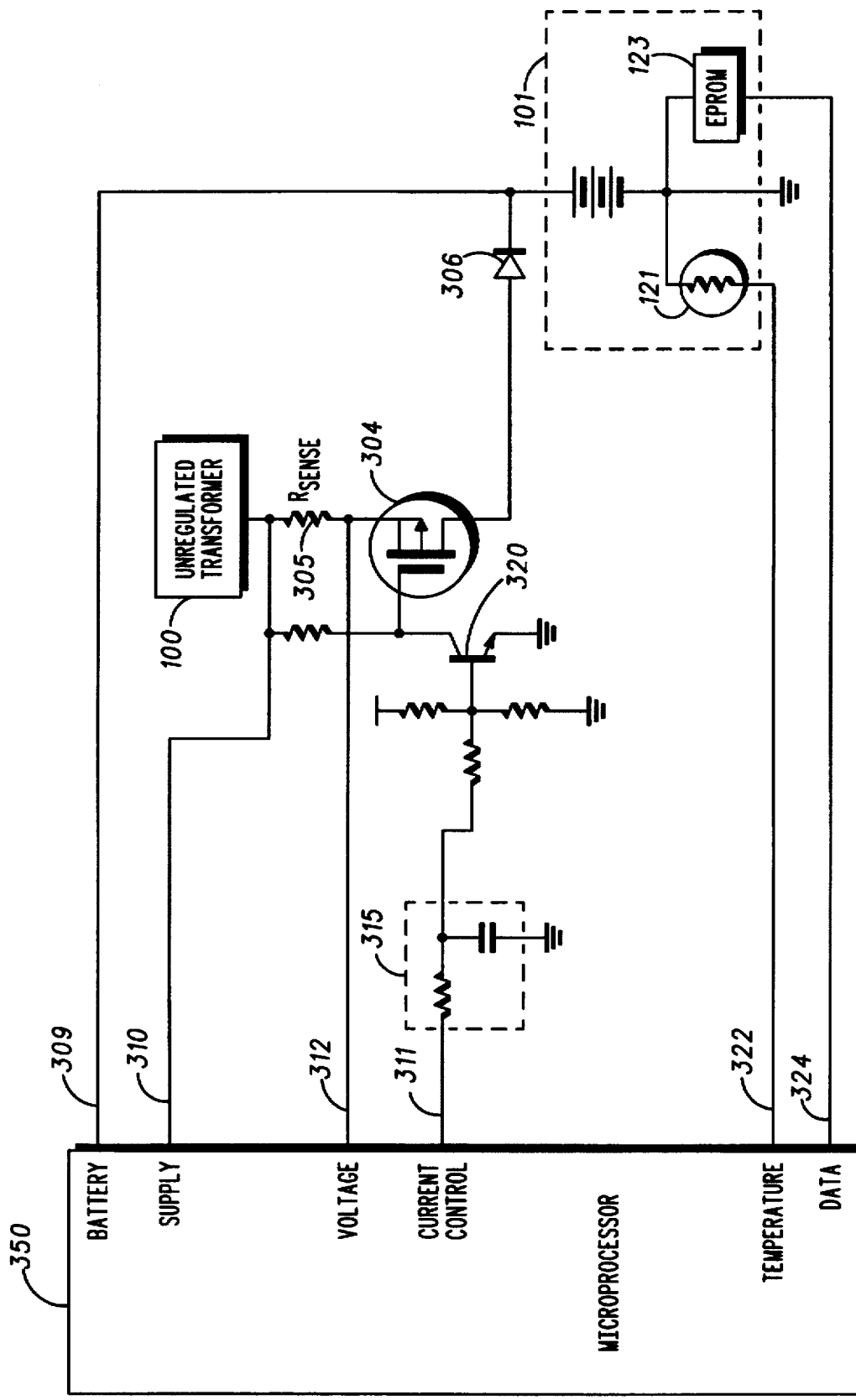

BATTERY CHARGER WITH POWER DISSIPATION CONTROL

FIELD OF THE INVENTION

This invention relates generally to battery chargers, and more particularly to fast charging of batteries using a pass device.

BACKGROUND OF THE INVENTION

Battery chargers generally use a regulator which rectifies an alternating current (AC) to produce a direct current (DC) for charging a battery. In one type of charger, called a series pass charger, a linear switch pass device such as a metal-oxide-semiconductor field-effect transistor (MOSFET) is connected between a regulator and the battery. When a battery is charging, the power dissipated by the pass device is equal to the difference between the input and output voltages of the pass device multiplied by the maximum charging current. When a battery is deeply discharged, the battery voltage, which is the voltage at the output of the pass device, is much less than the regulator voltage, which is the voltage at the input of the pass device. During this condition, the power dissipated by the pass device could exceed maximum power ratings of typical device packages found in portable electronic devices. During this period of high power dissipation by the pass device, excess heat is generated and the overall efficiency of the charger is very poor.

Conventional fast chargers for portable devices that are space and heat critical use an external tracking regulator to limit power dissipation in the charger's pass device. The tracking regulator provides a voltage that is a constant positive offset from the voltage of the battery being charged, thus holding the difference between the input and output voltages of the pass device relatively constant. A microprocessor senses the battery voltage and creates an analog control voltage proportional to a desired charging current. The charging current is controlled by a hardware feedback loop that senses a voltage drop across a sense resistor, scales it, and compares it to the control voltage. When the charging software calls for a change in the charging current based on a change in the battery voltage, the microprocessor changes the control voltage accordingly.

By keeping the voltage drop across the pass device relatively constant and only varying the charging current, the charger can easily control the power dissipation of the pass device. The tracking regulator that keeps the voltage drop constant, however, is application specific and expensive. Thus, there is a need for a battery charger that both limits power dissipation and eliminates the need for an expensive tracking regulator.

BRIEF DESCRIPTION OF THE DRAWINGS

FIG. 3 shows a battery charger according to a second preferred embodiment.

DETAILED DESCRIPTION OF THE PREFERRED EMBODIMENTS

The battery charger with power dissipation control includes a feedback loop that senses a present battery voltage, monitors the instantaneous power dissipation of a pass device, and creates a current control signal for charging a battery pack of a device such as a portable radiotelephone. A controller in the feedback loop may include hardware, software, or a combination of hardware and software. The controller adjusts the current control signal, based on the present pass device power dissipation, to ensure that the power dissipation of the pass device does not exceed calculated long-term and short-term power maximums. Also, polling a thermistor in the battery pack allows the controller to more accurately determine the power maximums of the pass device, because the maximum power that can be dissipated by the device varies with the ambient temperature around the device.

This battery charger dynamically adjusts for varying charging voltages, which allows replacement of the expensive external tracking regulator found in traditional battery charging topologies by a simple, unregulated DC transformer. Additionally, the voltage slump of a low-cost, unregulated DC transformer at high current amounts reduces the power that needs to be dissipated in the pass device, and the feedback loop monitors and exploits this characteristic. With software flexibility and proper selection of a low-cost, unregulated DC transformer, many types of batteries can be efficiently charged to capacity, including nickel-cadmium (NiCad), nickel-metal-hydride (NiMH), and lithium-ion (LiIon) batteries.

Figure 1:
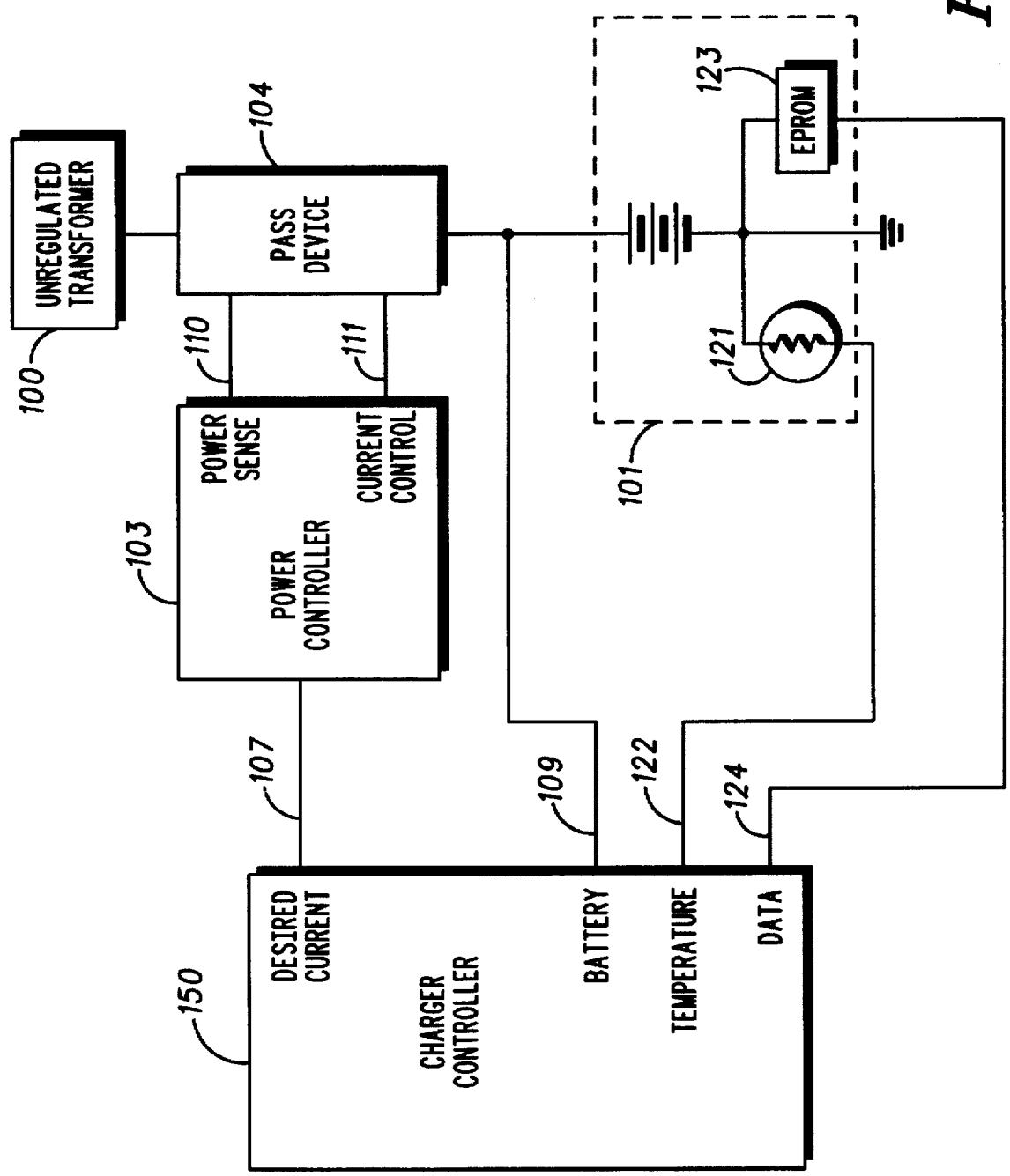
FIG. 1 shows a block diagram of a battery charger according to a preferred embodiment.

FIG. 1 shows a block diagram of a battery charger according to a preferred embodiment. In this approach, an inexpensive, unregulated DC transformer 100 such as a wall transformer provides an unregulated voltage to pass device 104 for charging battery pack 101. Battery pack 101 may be a battery pack for a portable radiotelephone and include a data storage device 123, which can be an electronic programmable read-only memory, such as an EPROM or EEPROM, retaining information such as charge rates and other charging parameters. Charger controller 150 can receive information from the data storage device through data input 124 to aid in the efficient charging of the battery.

Charger controller 150 can also determine the ambient temperature before charging a battery by polling a thermistor 121, which is built into most battery packs, using temperature sense input 122. Because maximum power dissipation of the pass device varies with temperature, the ambient temperature data can be used to scale the calculated maximum allowable power dissipation of the pass device. This scaling can improve charging times beyond any worst-case times based upon a worst-case dissipation scenario of the pass device 104.

Charger controller 150 also receives the instantaneous battery voltage through battery sense input 109. Thus, with information from data input 124, temperature sense input 122, and battery sense input 109, charger controller 150 can compute a desired charging current value based on stored charging rates and other charging parameters, the ambient temperature, and the present battery voltage. This computed desired charging current value is transmitted to power controller 103 through desired current output 107.

Power controller 103 produces a current control signal based on the desired charging current information from charger controller 150 and the instantaneous power dissipation of the pass device 104 as sensed through power sense input 110. A power FET with current sensing capability could easily be used to determine the instantaneous power dissipation of the pass device using the current output from the FET and calculating the voltage drop across the pass device 104. Power controller 103 scales the desired charging current value from charger controller 150 based on the information from power sense input 110 to create a current control signal. The current control signal is sent from current control output 111 of power controller 103 to the pass device 104 to keep the power dissipated by pass device 104 within acceptable power ratings.

Note that when the power controller 103 directs a reduction in charging current to limit pass device power dissipation, the battery charging time might increase. The amount of time increase is based upon the design of the transformer. If the transformer has a large voltage drop when sourcing large currents, a typical occurrence in unregulated DC transformers, the drop across the pass device will be less, which allows a higher charging current. If, however, the transformer voltage drop is very large, a large charging current cannot be used when a battery is near full charge.

An advantage to this approach is that the charger controls the power dissipation of the pass device by allowing the charging voltage to fluctuate and controlling only the charging current. A first feedback loop through charger controller 150 determines the desired current based on the present battery voltage, the ambient temperature, and information from a battery pack data-storage device. This desired current information is sent to a second feedback loop which includes power controller 103. Power controller 103 scales down the desired current value if the desired current value would cause excessive power dissipation at the pass device to produce a current control signal. The scaling is based on the instantaneous power dissipation information from power sense input 110. The resulting current control signal from current control output 111 allows the largest current through pass device 104 that does not exceed short-term and long-term power maximums.

Thus, the voltage at the output of the unregulated DC transformer 100 can vary, and the power controller 103 will dynamically adjust the charging current to avoid excessive power dissipation through the pass device 104. The charger controller 150 in combination with the power controller 103 calculate the absolute maximum and short-term maximum power dissipations of the pass device and ensure that these maximums are never exceeded, regardless of the condition of the unregulated DC transformer.

Figure 2:
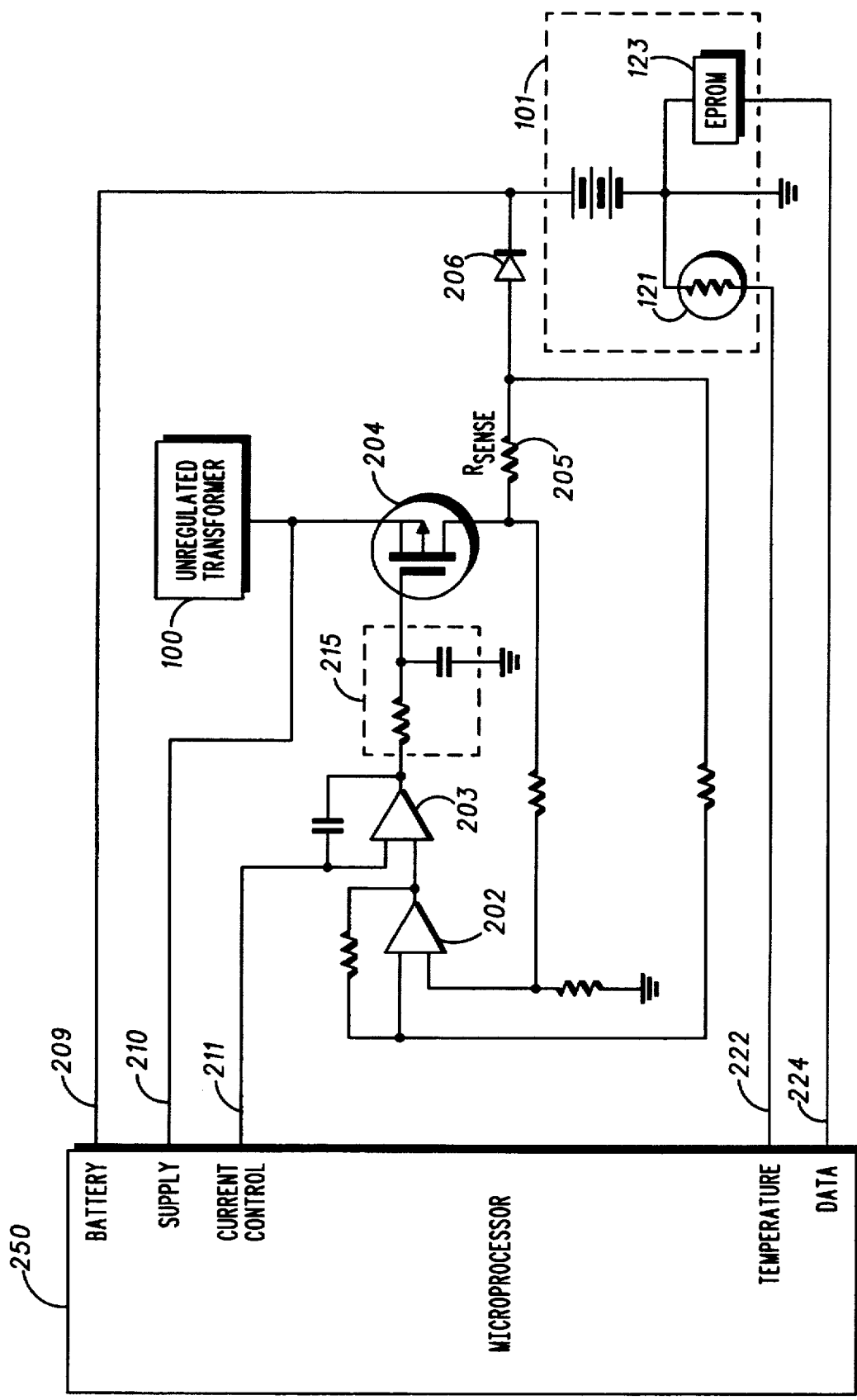
FIG. 2 shows a battery charger according to a first preferred embodiment.

FIG. 2 shows a battery charger according to a first preferred embodiment. The charger controller 150 and power controller 103 shown in FIG. 1 are implemented using a microprocessor 250 which senses the battery voltage through battery sense input 209 and the charging voltage from the transformer through supply sense input 210. Preferably sense inputs 209, 210 are connected to an analog-to-digital converter in microprocessor 250. Note that software functionality in any of these embodiments, including analog-to-digital conversion, may be implemented using hardware and vice versa.

Using information from the sense inputs, which represent the voltages on both sides of the pass device 204, the microprocessor 250 computes the voltage drop across the pass device. The microprocessor can then insure that the power dissipation of the pass device does not exceed the calculated maximum allowable by regulating a control signal from current control output 211, which directs the charging current control signal through operational amplifiers 202, 203. Preferably, the control signal at desired current output 211 is a pulse-width-modulated (PWM) waveform. As an alternative, microprocessor 250 can use a digital-to-analog converter to produce the control signal at desired current output 211.

The maximum power dissipation allowed through pass device 204 is calculated from ambient temperature information through temperature sense input 222 connected to a thermistor 121 preferably in the battery pack 101 and charging rates and other charging parameters from data input 224 connected to data storage device 123 in the battery pack 101. Other information, such as the pass device or transformer characteristics and ratings can also be used to determine the calculated maximum power dissipation through the pass device.

The voltage from the unregulated DC transformer 100 is fed through sense resistor 205 and diode 206 to charge the cells in battery pack 101. During charging, the voltage across sense resistor 205 is held constant by a hardware feedback loop including operational amplifiers 202, 203 and controlled by the signal from current control output 211. Operational amplifier 203 controls analog switch pass device 204 to set the output current of operational amplifier 202 as directed by the signal from desired current output 211 of the microprocessor. Operational amplifier 203 has a lowpass filter 215 at its output for stability.

FIG. 3 shows a battery charger according to a second preferred embodiment. In this approach, both the desired current feedback loop and the dynamic adjustment of the current control signal is brought into the microprocessor software. A low-cost, unregulated DC transformer 100 is again shown as the power source for charging battery pack 101 through diode 306. An analog-to-digital conversion device in microprocessor 350 monitors the voltage on both sides of sense resistor 305 as received through supply sense input 310 and voltage sense input 312. The microprocessor software uses this voltage information and the known resistance value of the sense resistor to calculate the current through the sense resistor, which is also the current through pass device 304. In this embodiment, sense resistor 305 is one-half of an ohm. Other resistor values may be substituted with a minor change in the microprocessor software.

Control for analog switch pass device 304 comes from a pulse-width-modulated (PWM) waveform at current control output 311 of the microprocessor 350. This waveform is filtered by a lowpass filter 315 and amplified by transistor device 320 before going to the gate of the pass device 304. As an alternative, the PWM signal at current control output 311 may be substituted with an analog signal from digital-to-analog (D/A) conversion software in the microprocessor 350.

The desired current value is based on the ambient temperature from temperature sense input 322, the present battery voltage as received through battery sense input 309, and data from data input 324. This desired current value is adjusted based on the instantaneous power dissipation of the pass device 304 to create a current control signal. The instantaneous power dissipation of the pass device 304 is equal to the instantaneous current through the sense resistor 305 multiplied by the instantaneous voltage across the pass device as calculated from voltage sense input 312 and battery sense input 309. Thus, the current control signal varies in reaction to any change in charging voltage from the unregulated DC transformer 100 or desired current as calculated by the microprocessor 350.

Many unregulated transformers begin to show output voltage ripple when the current exceeds half of the rated current of the transformer. This voltage ripple will commonly be at the full-wave-rectified 120/100 Hz, which is sensed by supply sense input 310 and can be filtered out by the microprocessor software. Once the software determines the frequency and magnitude of the ripple, an error function in the microprocessor 350 could be used to create a correction signal, and a summer implemented in software could minimize the ripple. Note that with a hardware feedback loop such as that shown in FIG. 2, operational amplifiers filter out any voltage ripple.

Thus, the battery charger with power dissipation control provides a low cost alternative to traditional fast battery charging methods. While specific components and functions of the battery charger with power dissipation control are described above, fewer or additional functions could be employed by one skilled in the art within the true spirit and scope of the present invention. The invention should be limited only by the appended claims.

We claim:

1. A battery charger comprising:
   a pass device configured for connection to an unregulated transformer;
   a charger controller configured for connection to a battery for calculating a desired battery charging current value based on a battery voltage;
   a power controller connected to the charger controller and connected to the pass device for converting the desired battery charging current value from the charger controller to a current control signal based on an instantaneous power dissipation of the pass device.

2. A battery charger according to claim 1 wherein the charger controller comprises:
   a battery sense input configured for connection to a battery for sensing a present battery voltage.

3. A battery charger according to claim 1 wherein the power controller comprises:
   a power sense input connected to the pass device for sensing instantaneous power dissipation of the pass device.

4. A battery charger according to claim 1 wherein the power controller comprises:
   a current control signal output connected to a gate of the pass device for controlling current across the pass device.

5. A battery charger according to claim 1 wherein the charger controller comprises:
   a software feedback loop.

6. A battery charger according to claim 1 wherein the power controller comprises:
   a software feedback loop.

7. A battery charger according to claim 1 wherein the charger controller comprises:
   a temperature sense input configured for connection to a thermistor.

8. A battery charger according to claim 1 wherein the charger controller comprises:
   a data input configured for connection to a data storage device.

9. A battery charger comprising:
   a pass device having an input configured for connection to an unregulated transformer and an output configured for connection to a battery; and
   a controller comprising:
      a first voltage sense input connected to the input of the pass device;
      a second voltage sense input configured for connection to the battery; and
      a current control output connected to a gate of the pass device, wherein the current control output has a decreased output current when a voltage difference between the first voltage sense input and the second voltage sense input exceeds a predetermined threshold.

10. A battery charger according to claim 9 further comprising:
    a sense resistor connected between the output of the pass device and the battery;
    a circuit connected to the current control output having an operational amplifier for applying a current control signal based on an instantaneous power dissipation of the pass device to a gate of the pass device.

11. A battery charger according to claim 9 wherein the controller further comprises:
    a temperature sense input for connection to a thermistor.

12. A battery charger according to claim 9 wherein the controller further comprises:
    a data input for connection to a data-storage device.

13. A battery charger comprising:
    a pass device having an input configured for connection to an unregulated transformer; and
    a controller comprising:
       a first voltage sense input connected to the input of the pass device;
       a second voltage sense input configured for connection to a battery;
       a third voltage sense input configured for connection to the unregulated transformer; and
       a current control signal output connected to a gate of the pass device.

14. A battery charger according to claim 13 further comprising:
    a sense resistor connected between the first voltage sense input and the third voltage sense input.

15. A battery charger according to claim 13 further comprising:
    a transistor connected between the current control output and the pass device.

16. A battery charger according to claim 13 further comprising:
    a diode connected between the pass device and the second voltage sense input.

17. A battery charger according to claim 13 wherein the controller further comprises:
    a temperature sense input for connection to a thermistor.

18. A battery charger according to claim 13 wherein the controller further comprises:
    a data input for connection to a data-storage device.

19. A method for charging a battery comprising the steps of:
    connecting an unregulated transformer to a pass device;
    connecting the pass device to a battery;
    sensing a battery voltage of the battery;
    computing a desired charging current value for the battery;
    sensing an instantaneous power dissipation of the pass device;
    producing a current control signal based on the desired charging current value and the instantaneous power dissipation of the pass device;
    transmitting the current control signal to the pass device.

20. A method for charging a battery comprising the steps of:
    connecting an unregulated transformer to a pass device;
    connecting the pass device to the battery;
    sensing a battery voltage of a battery;
    sensing an output voltage of the unregulated transformer;
    producing a current control signal;
    transmitting the current control signal to the pass device.

* * * * *